US008401708B2

(12) United States Patent
Nagata et al.

(10) Patent No.: US 8,401,708 B2
(45) Date of Patent: Mar. 19, 2013

(54) ELECTRIC POWER SYSTEM

(75) Inventors: Satoshi Nagata, Tokyo (JP); Akio Tanaka, Tokyo (JP)

(73) Assignee: VPEC, Inc., Tokyo (JP)

( * ) Notice: Subject to any disclaimer, the term of this patent is extended or adjusted under 35 U.S.C. 154(b) by 856 days.

(21) Appl. No.: 12/531,222

(22) PCT Filed: Mar. 26, 2007

(86) PCT No.: PCT/JP2007/056193
§ 371 (c)(1),
(2), (4) Date: Sep. 14, 2009

(87) PCT Pub. No.: WO2008/117392
PCT Pub. Date: Oct. 2, 2008

(65) Prior Publication Data
US 2010/0023174 A1    Jan. 28, 2010

(51) Int. Cl.
*G05D 11/00* (2006.01)
(52) U.S. Cl. ............... 700/291; 700/48; 706/21
(58) Field of Classification Search .......... 700/22, 700/47, 48, 286, 287, 288, 291, 295, 297; 706/16, 20, 21, 23
See application file for complete search history.

(56) References Cited

U.S. PATENT DOCUMENTS
5,297,015 A * 3/1994 Miyazaki et al. ............. 363/146
7,489,988 B2 * 2/2009 Matsui et al. ................. 700/287

FOREIGN PATENT DOCUMENTS
| JP | 4-372046 | 12/1992 |
| JP | 7-72904 | 3/1995 |
| JP | 10-281612 | 10/1998 |
| JP | 11-275762 | 10/1999 |
| JP | 2000-179911 | 6/2000 |
| WO | WO 2004/073136 A1 | 8/2004 |

OTHER PUBLICATIONS
International Search Report for International Application No. PCT/JP2007/056193 dated Apr. 6, 2007. 1.

* cited by examiner

*Primary Examiner* — Jeffrey A Gaffin
*Assistant Examiner* — Chad Rapp
(74) *Attorney, Agent, or Firm* — Kratz, Quintos & Hanson, LLP

(57) ABSTRACT

The electric power supply and demand control device judges whether or not electric power shortage is occurred or whether or not electric power surplus is occurred in the electric power supplier and demander provided with the electric power supply and demand control device based on data on total electric energy, the amount of maximum electric power demanded, and the amount of total electric power demanded of the following day in each electric power supplier and demander, predicted by a neural network; receives electric power from other electric power suppliers and demanders provided with the power generation devices and/or the electrical storage devices in the case where electric power shortage is occurred in the electric power supplier and demander; and controls to deliver electric power to other electric power suppliers and demanders in the case where electric power surplus is occurred in the electric power supplier and demander.

8 Claims, 10 Drawing Sheets

☐ *Unit to supply and demand electric power*

☐ *Unit to supply and demand electric power*

☐ *Unit to supply and demand electric power*

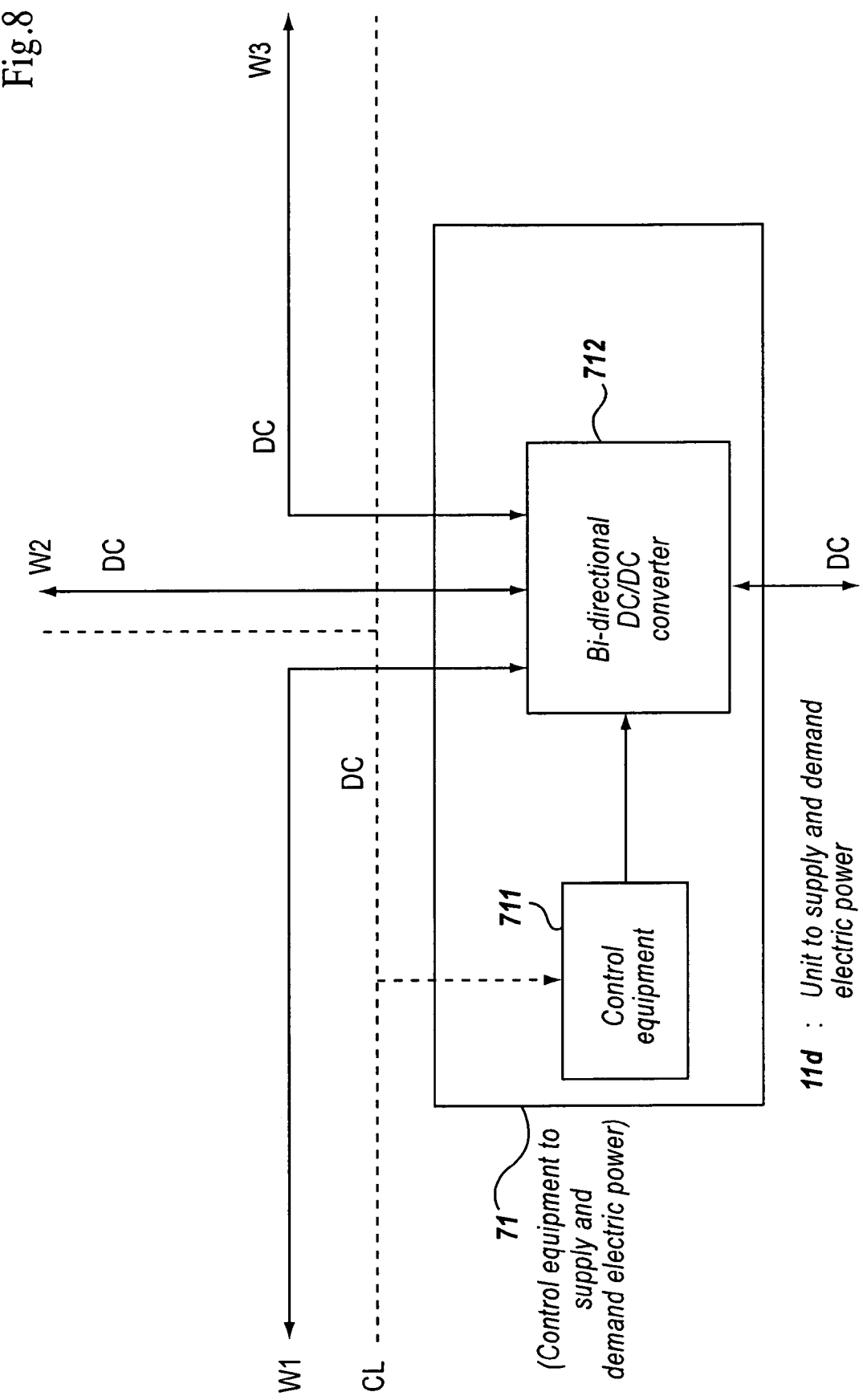

ELECTRIC POWER SYSTEM

TECHNICAL FIELD

The present invention relates to an electric power system in which a plurality of electric power suppliers and demanders is mutually connected by electric power supply and demand control devices.

BACKGROUND ART

In a known electric power system, as shown in FIG. 10, "radial system," in which a large-scale power plant 91 is a top and demanders 92 are a base, is fundamental. In FIG. 10, in order to ensure a plurality of transmission systems, a "loop system" is introduced in some part. This kind of electric power system is configured, as a single system, in a broad area (for example, several tens of thousands $km^2$) and large scale (several tens GW).

On the other hand, in recent years, a distributed power generation system of a system collaborative type (for example, refer to Patent Document 1) with solar generation and a fuel cell has been focused. The distributed power generation system of the system collaborative type is usually built in an end region or a local region near the end of the known radiated electric power system, and is premised on interconnection with the electric power system.
Patent document 1: Japanese Patent Application Laid-Open No. 6-327146
Patent Document 2: Japanese Patent Application Laid-Open No. 2004-15882

DISCLOSURE OF THE INVENTION

Problem to be Solved by the Invention

In the known electric power system structure shown in FIG. 10, since transportation of electric power is massively carried out over a long distance and is always continuously performed ("simultaneous equal amount rule"), there are a lot of losses; and in electric generation come from reproducible energy such as solar energy and wind power energy, since its reproducible energy is ubiquitous, it is difficult to build a large scale power plant using these energies.

An object of the present invention is to provide an electric power system in which a plurality of electric power suppliers and demanders who demand electric power and also supply electric power is configured by being mutually connected by electric power supply and demand control devices, the electric power system being self-sustainable without depending on the known electric power system. This does not intend that the system of the present invention eliminates coexisting with the known electric power system.

Means for Solving the Problem

According to a first configuration of an electric power system of the present invention to solve the above problem, there is provided an autonomous distributed electric power system which accommodates excess or deficient electric power among respective electric power suppliers and demanders with each other, in which a plurality of electric power suppliers and demanders is directly or indirectly mutually connected, the electric power supplier and demander being provided with one or a plurality of power generation devices, one or a plurality of electrical storage devices and one or a plurality of electric power consumption devices, and an electric power supply and demand control device.

In the electric power system, each of the electric power supply and demand control devices judges whether or not electric power shortage is occurred or whether or not electric power surplus is occurred in each of the electric power suppliers and demanders provided with the electric power supply and demand control device, receives electric power from other electric power supplier and demander in the case where electric power shortage is occurred in the electric power supplier and demander, and controls to deliver electric power to other electric power supplier and demander in the case where electric power surplus is occurred in the electric power supplier and demander.

The above judgment and control are automatically or manually performed based on that a pattern classification model for a neural network is formed in a computer, total production of electricity, the amount of maximum electric power demanded, and the amount of total electric power demanded of the following day are predicted based on of at least past actual performance data, weather forecast and calendar information of the following day, and theoretical amount of solar radiation at fine weather and wind-force of the day, actual performance data of the forecast items and weather, calendar information, theoretical amount of solar radiation and wind-force and the like of a past fixed period including at least the day are collected for neural network relearning, the relearning is performed by an error back propagation algorithm based on the prediction data and actual performance data of the day, and the total production of electricity, the amount of maximum electric power demanded, and the amount of total electric power demanded of the following day are predicted by an updated neural network.

Furthermore, according to a second configuration of an electric power system of the present invention, there is provided an electric power system in which a plurality of electric power suppliers and demanders is mutually connected, the electric power supplier and demander being provided with at least one device selected from one or a plurality of power generation devices, one or a plurality of electrical storage devices and one or a plurality of electric power consumption devices, and an electric power supply and demand control device.

In the electric power system, the plurality of the electric power suppliers and demanders is sectioned into a plurality of groups; and the electric power supply and demand control device which belongs to each group judges whether or not electric power shortage is occurred or whether or not electric power surplus is occurred in the group, receives electric power from other group to which the electric power supplier and demander provided with the power generation device and/or the electrical storage device belongs in the case where electric power shortage is occurred in the group, and controls to deliver electric power to other group in the case where electric power surplus is occurred in the group, and controls the plurality of the power generation devices in the respective electric power suppliers and demanders of the respective groups in the delivery and receipt of electric power among the respective groups.

The above judgment and control are automatically or manually judged and controlled based on that a pattern classification model for a neural network is formed in a computer, total production of electricity, the amount of maximum electric power demanded, and the amount of total electric power demanded of the following day are predicted based on at least past actual performance data, weather forecast and calendar information of the following day, and theoretical amount of solar radiation at fine weather and wind-force of the day, actual performance data of the forecast items and weather, calendar information, and theoretical amount of solar radiation of a past fixed period including at least the day are collected for neural network relearning, the relearning is performed by an error back propagation algorithm based on the prediction data and actual performance data of the day, and the total production of electricity, the amount of maximum electric power demanded, and the amount of total electric power demanded of the following day are predicted by an updated neural network.

Each electric power supplier and demander of the electric power system of the present invention can set or change operating conditions of the electric power supply and demand control device of each electric power supplier and demander based on prediction information of the total production of electricity, the amount of maximum electric power demanded, and the amount of total electric power demanded of the following day of other electric power supplier and demander obtained from other electric power supplier and demander.

In the exchange between surplus electric power and shortage electric power which are supplied and demanded among the respective electric power suppliers and demanders, information on the supply and demand electric power (for example, power supplying total electric energy and power supplying time, power receiving electric energy/time and power receiving time, and the like) are exchanged from the power supplying side to the power receiving side and from the power receiving side to the power supplying side via a communication network such as the Internet; and accordingly, it is possible to monitor whether or not the supply and demand of power generation is properly performed, for example, it is possible to check whether or not electric power is stolen in midstream.

In the electric power system of the present invention, the electrical storage device in the electric power supplier and demander can use a storage battery and an electric double-layer capacitor together. Furthermore, in an electrical device such as an individual refrigerator and air conditioner in each electric power supplier and demander, there is a case where one provided with an electrical storage device serving as a backup power source such as a battery which can operate the device for a predetermined time, for example, about 2 hours.

The electrical storage device makes up for electric power shortage at a peak, the peak being a peak of electric power demand in general households or offices which is difficult to be predicted, viewed from electric power supply performance by a power generation device and an electrical storage device in each electric power supplier and demander; and accordingly, there is an advantage capable of reducing unnecessary backup electric power facilities in each electric power supplier and demander.

Incidentally, in an electric power system depending on the known electric power system, backup electric power that would be necessary is set by dividing respective demander strata into several strata and by taking in peak electric power consumption of the respective demander strata; and therefore, it is assumed that large backup electric power facilities are essential. In this point, in the system of the present invention, electric power which is insufficient at the peak in general households whose demand peak is difficult to be predicted is, in a manner, self-compensated. Therefore, total backup electric power facilities in nations and regions can be reduced.

In this case, it is preferable to quantitatively comprehend a change in the amount of electrical storage of the storage battery and its charge and discharge transient operation characteristics. This can properly comprehend and analyze charge and discharge phenomena of the storage battery and the electric double-layer capacitor.

When the amount of electrical storage of the storage battery is detected, the amount of charge and discharge can be controlled so that its detected value is not to be less than a predetermined lower limit; accordingly, transient response characteristics of the capacitor can be utilized without involving unnecessary consumption of the storage battery.

Further, in the present invention, although not shown in the drawing, a movable power generation device and/or a movable electrical storage device provided by any electric power supplier are/is moved to other electric power supplier and delivery and receipt of necessary electric power can be performed there.

In the system of the present invention, surplus electric power which is still overabundant in each electric power supplier and demander is put together as electric power circumstances or electric power information in a plurality of electric power suppliers and demanders based on electric power data in which data of the surplus electric power is collected from each electric power supplier and demander and these are totaled, treated, and accumulated; and the surplus electric power can be intended for buying and selling transaction of electric power and emission credit of global warming gas. Incidentally, not only surplus electric power, but also all electric power of reproducible energetic origin can be intended depending on rules of nations and regions.

For example, each electric power data, in which the surplus electric power in each electric power supplier and demander is measured, is accumulated in temporal sequence as each electric power information; and the electric power information accumulated for each predetermined time which can be arbitrarily set is sent to a putting-together server unit. The putting-together server unit receives the electric power information sent from a plurality of electric power suppliers and demanders and totals; and registers in database in the putting-together server unit and puts together.

Then, the electric power information statistically treated by the putting-together server unit; past actual performance is educed; and future electric power predicted based on the information can be put on sale to electric power buying and selling markets.

Furthermore, the electric power information is cumulatively treated by the putting-together server unit; and is further converted to the amount of reduction in global warming gas by a deductive method in accordance with established laws and ordinances, and rules and regulations, or by an appropriate deductive method. Then, the future amount of reduction in global warming gas predicted based on actual performance of the past converted amount of reduction in global warming gas can be put on sale to buying and selling markets as the emission credit of the global warming gas.

Effect of the Invention

The present invention is an electric power system in which a known electric power system is not provided and each electric power supplier and demander is basically independent. That is, each electric power supplier and demander performs control of sending and receiving (also referred to as delivery and receipt, hereinafter, same as above) of electric power with other electric power suppliers and demanders by a neural network based on prediction data such as prediction production of electricity and the amount of prediction electric power demanded of each electric power supply and demand when electric power shortage or electric power surplus is occurred; and accordingly, it becomes possible to achieve independence in the whole system in which respective electric power suppliers and demanders are coupled by an electric power network.

In the present invention, a plurality of the electric power suppliers and demanders can be connected to a branched electric power supply and demand line, a beaded electric power supply and demand line, a radiated electric power supply and demand line, a net shaped electric power supply and demand line, or an electric power supply and demand line combined by these lines (hereinafter, the before mentioned each line is also referred to as an electric power supply and demand network in the present invention).

In the present invention, respective electric power suppliers and demanders control electric power supply and demand of the respective electric power suppliers and demanders while exchanging supply and demand information of mutual electric power among the respective electric power supply and demand control devices. Information exchange at this time can be performed via a data communication network such as the Internet.

In the present invention, a plurality of the electric power suppliers and demanders can be connected in DC with each other in order to sufficiently utilize advantage of DC electrical transmission and distribution.

BEST MODE FOR CARRYING OUT THE INVENTION

FIG. 1 is an explanation diagram showing an embodiment of an electric power system of the present invention;

FIG. 2 is a block diagram exemplifying a configuration of one electric power supplier and demander and an electric power supply and demand control device thereof;

FIG. 3 is an explanation diagram at a time when an electric power supply and demand control device of an electric power supplier and demander performs supply and demand of AC electric power with other electric power supplier and demander in an electric power system of the present invention;

FIG. 4 is an explanation diagram at a time when an electric power supply and demand control device of an electric power supplier and demander performs supply and demand of DC electric power with other electric power supplier and demander in an electric power system of the present invention;

FIG. 5 is an explanation diagram in the case of supplying DC electric power to a load via house wiring of an electric power supplier and demander in an electric power system of the present invention;

FIG. 6 is an explanation diagram showing a state where electric power suppliers and demanders are hierarchized in an electric power system of the present invention;

FIG. 7(A) is an explanation diagram in the case where electric power suppliers and demanders are connected in a branched shape;

FIG. 7(B) is an explanation diagram in the case where the electric power suppliers and demanders are connected in a star shape; and FIG. 7(C) is an explanation diagram in the case where the electric power suppliers and demanders are connected in a net shape;

FIG. 8 is a diagram showing an example of an electric power supplier and demander connected via an electric power supply and demand line which is different from a plurality of other electric power suppliers and demanders;

FIG. 9 is a block diagram showing process example of a neural network: and

FIG. 10 is an explanation diagram showing a known electric power system.

An electric power system 1 shown in FIG. 1 shows only electric power suppliers and demanders of a plurality of electric power suppliers and demanders 11 to 15. The respective electric power suppliers and demanders 11 to 15 are mutually connected via an electric power supply and demand line W.

The electric power supplier and demander 11 is provided with a power generation device 101, an electrical storage device 102, a plurality of loads (electrical devices) 103, and an electric power supply and demand control device 104. Incidentally, a plurality of electrical devices 103 is shown by A1, A2, . . . , An. Furthermore, in FIG. 1, other electric power suppliers and demanders 12, 13, and 14 and other electric power supplier and demander (not shown in the drawing) are also provided with a power generation device, an electrical storage device, a plurality of loads (electrical devices), and an electric power supply and demand control device as in the electric power supplier and demander 11; and, each device is connected to branched shape house wiring. Incidentally, there is also a case where all the respective electric power suppliers and demanders or arbitrary electric power suppliers and demanders mount the power generation device 101 and/or the electrical storage device 102 on a pallet of a truck or the like or provide them in a mountable manner, and deliver the power generation device 101 and/or the electrical storage device 102 to other electric power suppliers and demanders as needed; and delivery and receipt of electric power is performed there.

In the present invention, the respective electric power suppliers and demanders are loosely coupled thereamong. That is, each of the electric power suppliers and demanders is basically of an independent type, can receive electric power from other electric power supplier and demander when electric power shortage is occurred, and can supply electric power to other electric power supplier and demander when electric power surplus is occurred.

The electric power supplier and demander 11 is, for example, general houses, multiple dwelling houses, small, medium, and large scale factories, low-rise, medium-rise, and high-rise buildings and the like. Further, a group in which these general houses and multiple dwelling houses are collected can also serve as the electric power supplier and demander 11 of the present invention.

Typically, the power generation device 101 is a solar generator and a DC power supply such as a fuel cell or the like. There is also a case where wind generation, biomass generation, or a co-generation system (hereinafter, referred to as co-gene in this description) such as a gas engine system, a gas turbine system, a fuel cell system, and the like is used as the power generation device 101. A wind generation device, a biomass generation device, and the co-gene usually serve as an AC power supply; however, its output is AC/DC converted and can be used as a DC power supply. In addition, the electrical storage device 102 serves as a DC power supply.

Further, although not shown in the drawing, a flywheel unit can also be used for the power generation device 101. The flywheel unit can also be used for the electrical storage device 102. Furthermore, an electrical storage device combined by a storage battery and an electric double-layer capacitor is also included. There is a case where the power generation device 101 and/or the electrical storage device 102 are/is mounted on a truck pallet or the like and moved to other electric power supplier, and delivery and receipt of electric power is performed there. The load 103 is, for example, a DC device or an AC device, such as an electric light, an air conditioner, a refrigerator, an electromagnetic cooking device, a rice cooker, and the like.

As shown in FIG. 2, by way of example, the electric power supply and demand control device 104 has a control unit 104b which detects a time when electric power surplus is occurred in the electric power supplier and demander 11, for example, a time when the amount of electric power use of the load 103 is reduced and the electrical storage device 102 is near full charge or full charge and can supply electric power generated by the power generation device 101 from an electric power sending and receiving unit 104a to other electric power supplier and demander or the electric power supplier and demander 15, which is connected to the electric power supply and demand line W. There is also a case where this supply of electric power is performed by movement of the power generation device 101 or movement of the electrical storage device 102 without using the electric power supply and demand line W. Furthermore, the electric power supply and demand control device 104 has the control unit 104b which detects a time when electric power shortage is occurred in the electric power supplier and demander 11, for example, a time when the amount of electric power use of the load 103 is rapidly increased. Then, the electric power supply and demand control device 104 has the electric power sending and receiving unit 104a which receives electric power via the electric power supply and demand control devices of other electric power suppliers and demanders 12, 13, and 14 in which electric power surplus is occurred, the electric power suppliers and demanders being connected to the electric power supply and demand line W, or via an electric power supply and demand control device 153 (to be described later) of the electric power supplier and demander 15 and can drive the load 103 through control of the control unit 104b, or can store in the electrical storage device 102.

The electric power supplier and demander 15 includes a power generation device 151, an electrical storage device 152, and the electric power supply and demand control device 153. Incidentally, the electric power supplier and demander can include only either the power generation device or the electrical storage device. The power generation device 151 is typically a middle scale facility for thermal power, hydraulic power, wind power and the like including a co-gene and a biomass generation facility; and the electrical storage device 152 is typically a secondary battery; however, there is also one which is combined by the storage battery (secondary battery) and the electric double-layer capacitor. The electric power supplier and demander 15 can supply electric power to the electric power supplier and demander 11 (or, other electric power suppliers and demanders 12 to 14 and the like) as described above via the electric power supply and demand control device 153. Furthermore, conversely, the electric power supplier and demander 15 can receive supply of electric power from the electric power supplier and demander 11 (or, other electric power suppliers 12 to 14 and the like). Delivery and receipt of electric power in the electric power supplier and demander 15 is also performed via the electric power supply and demand control device; however, as described before, the delivery and receipt of the electric power may be performed by introducing the movable power generation device and electrical storage device of other electric power supplier and demander to the supplier and demander 15.

Electric power in which the electric power supplier and demander 15 supplies to the electric power supplier and demander 11 and the like is electric power generated by the power generation device 151 or electric power stored in the electrical storage device 152; and electric power in which the electric power supplier and demander 15 is supplied from the electric power supplier and demander 11 and the like is stored in the electrical storage device 152. In the electric power system of the present invention, a plurality of power generation devices including a co-gene and a biomass generator in respective power suppliers and demanders can be controlled both automatically and manually based on weather forecast, electric power demand prediction, values based on heat demand prediction, values set by each electric power supplier and demander, or the like in the delivery and receipt of electric power via the electric power supply and demand control device of each electric power supplier and demander (refer to 104c shown in FIG. 2). Further, each electric power supplier and demander refers to various information from the electric power supply and demand control device in other electric power supplier and demander and can set or change operating conditions of the electric power supply and demand control device of the electric power supplier and demander based on the amount of electric power consumption which is estimated by the electric power supplier and demander (refer to FIG. 2).

In the above respective power generation devices 101 and 105, control may be made individually for each power generation device, for example, a solar generator is controlled by a conditioner; and a fuel cell and a micro generator are controlled by a power conditioner. However, in the electric power system of the present invention, a control element common to each power generation device is overall controlled by the electric power supply and demand control devices 104 and 105 and a control element specific to an individual power generation device is individually controlled; accordingly, the power generation devices 101 and the same 151 in a handful of the electric power supplier and demander 11 and the same 15 can be optimally controlled as a whole.

Incidentally, each power generation device such as a known solar generator and a fuel cell only performs control of full output control and system connection by each power conditioner; however, in the present invention, electric power to be supplied and demanded by utilizing a flywheel unit or the like is equalized between output of each power generation device from zero to full output, so that control can be made freely by the electric power supply and demand control devices 104 and 153.

On the other hand, the above electrical storage devices 102 and 152 typically use a secondary battery independently as a DC power supply. However, in the electric power system of the present invention, the storage battery (secondary battery) and the electric double-layer capacitor can be used together for the electrical storage devices 102 and 152.

When the above storage battery and the electric double-layer capacitor are used together, for example, control to use depending on electrical storage characteristics and discharge characteristics is controlled by the electric power supply and demand control devices 104 and 153; accordingly, it becomes possible to reasonably respond to diversification of supply and demand mode of electric power in each electric power supplier and demander or diversification of supply mode of electric power in each supplier and demander.

In this case, the storage battery and the electric double-layer capacitor are decentrally arranged, for example, the electric double-layer capacitor is mounted on the electric power supply and demand control devices 104 and the same 153, and the storage battery is separately disposed or mounted on the electrical device 103; accordingly, a remaining battery level of the electrical storage devices 102 and 152 can be passed to supply according to priority order of electric power demand destinations by way of example.

Further, formerly, various kinds of electrical devices serving as the load 103 provided with the electric power supplier and demander 11 are individually operated by simply individually inputting and cutting off (ON and OFF) electric power.

However, in the electric power system of the present invention, a starting preferential order and the size of starting electric power (descending order, or reverse order thereof) of an individual electrical device such as a refrigerator, an air conditioner, a TV, or the like, which constitutes the load 103 in the electric power supplier and demander 11, are set in the electric power supply and demand control device 104; for example, control is made so as to be an order in which a starting order (or a cutting off order) or an order in which an electromotive force is in a descending order; accordingly, it becomes possible to equalize electric power consumption. Furthermore, when an electrical device with large starting electric power is started, the electric power supply and demand control device 104 can be actuated so that electric power at a time of starting of a device with large starting electric power is supplied from the storage battery provided with the electric double-layer capacitor and the flywheel unit.

Further, for difficult predictable electric power demand in general households and its peak time, for example, an electrical storage device such as a battery capable of operating the device 103 for approximately 2 hours is mounted in the electrical device 103 such as a household refrigerator and an air conditioner so that electric power shortage at the demand peak time can be made up in the inside of the electric power demander. This technique also contributes to equalization of electric power consumption.

When electric power consumption can be equalized by controlling priority order at a time of starting as described above, there can be performed dispersion control of an excess current which is easy to flow to the electric power supply and demand control device 104 and the respective electrical devices 103 at a time of starting of the respective electrical devices 103; therefore, there can be prolonged duration of life of the control device 104 itself, the respective electrical devices, or wiring components such as wiring for connecting therebetween.

In addition, control can be made so as not to cause a large pulsation or so as to be difficult to cause a pulsation in which current becomes maximum or minimum by the electric power supply and demand control device 104. Therefore, it is useful for ensuring more stable operation of the electric power supply and demand control device 104 and the individual electrical device 103.

Further, the electric power supply and demand control device 104 and the electric power use are made in DC so that the standby mode of the TV for example or the standby operation of other devices can be eliminated. Therefore, waste of power consumption can be suppressed.

In the electric power system shown in FIG. 1, in the case where the electric power supply and demand control device 104 performs supply and demand of electric power with other electric power suppliers and demanders 12 to 15, the electric power supply and demand control device 104 exchanges information with electric power supply and demand control devices of the other electric power suppliers and demanders and determines supply and demand conditions or the like.

In the electric power system of the present invention, total production of electricity, the amount of maximum electric power demanded, and the amount of total electric power demanded of the following day of each electric power supplier and demander, in which prediction values can be obtained by a neural network of the control block shown in FIG. 9, can be served as the above information to be information-exchanged. This point will be described in the following.

In the present invention, first, "solar cell total production of electricity," "the amount of daily maximum electric power demanded," and "the amount of daily total electric power demanded" of the following day of each electric power supplier and demander are estimated (predicted). The estimation is performed by inputting weather forecast of the following day and past weather information, each actual performance of "solar cell total production of electricity," "the amount of daily maximum electric power demanded," and "the amount of daily total electric power demanded," calendar information (day of the week and public holiday), and theoretical amount of solar radiation data in a region and its neighboring region of each supplier and demander, in a hierarchy-type neural network.

The neural network learns a climate pattern in a region and a periphery region of each electric power supplier and demander and data combination of actual performance of total production of electricity and electric power demand in the region as a pattern; and performs nonlinear interpolation estimation by checking a weather forecast pattern of the following day against the past pattern.

The pattern learning performs update of a model using daily observational data. Therefore, estimation accuracy also continues to improve day by day. Furthermore, the pattern learning can respond by autonomous model update to environmental variation (solar cell total production of electricity, change in demander, longer-term weather fluctuation, medium-term abnormal meteorological phenomena, and the like) in each region of each electric power supplier and demander. Incidentally, establishment of database of each supplier and demander in a region of each electric power supplier and demander is not required.

The above prediction is performed by the following procedure.

(i) Prepare a neural network model which predicts production of electricity and the amount of electric power demanded (in the case of no presence of the above data, a provisional model is made by dummy data). Input past actual performance data, weather forecast and calendar information of the following day, and the amount of solar radiation at fine weather of the day (theoretical value) in the model. (At this time, it is preferable to add weather information of not only the region but also a neighboring region, in order to improve prediction accuracy.)

(ii) Predict total production of electricity, the amount of maximum electric power demanded, and the amount of total electric power demanded. (Nonlinear interpolation estimation by pattern checking)

(iii) Collect actual performance data for neural network relearning.

Collect actual performance data, and prepare neural network relearning. The actual performance data are various kinds of actual performance data of a past fixed period including the day (production of electricity, maximum electric power, total electric power, weather, calendar information, and theoretical amount of solar radiation at fine weather).

(iv) Make the neural network relearn using back propagation (error back propagation algorithm).

(v) Predict total production of electricity, the amount of maximum electric power demanded, and the amount of total electric power demanded of the following day by an updated neural network.

Afterward, improve accuracy of prediction data by repeating (i) to (v).

If prediction values (data) of the total production of electricity, the amount of maximum electric power demanded, and total electric energy of the following day in each electric power supplier and demander are obtained by performing as described above, sending and receiving of electric power of the following day among respective electric power suppliers and demanders is decided in advance after mutually comparing and considering respective data by exchanging information (data) among the respective electric power suppliers and demanders. Actual performance data of sending and receiving of electric power of the day is remained, and is served as one of basic data of sending and receiving of electric power among the respective electric power suppliers and demanders from the day after next (the following day as viewed from the day).

In the electric power system shown in FIG. 1, the supply and demand of electric power among the electric power suppliers and demanders can be performed by AC or can be performed by DC; however, in either case, construction can be made as a local electric power system or construction can be made as a large electric power system in which these electric power systems are combined.

In the electric power system shown in FIG. 1, although not shown in the drawing, there is also a case where the electric power supplier and demander made up of only loads is connected to the electric power supply and demand line W. Furthermore, in the electric power system shown in FIG. 1, equalization of supply and demand electric power is performed by mutually connecting many and various electric power suppliers and demanders.

In the case where the electrical storage device 102 of the electric power supplier and demander 11 is large capacity, and when it is high cost, it becomes possible to purvey the loads by electric power to be supplied from other electric power supplier and demander by using small capacity as the electrical storage device 102 (or, not being provided with the electrical storage device 102). In this case, it is preferable that electric power suppliers and demanders different in time slot electric power consumption pattern (for example, houses and business establishments) exist together in the electric power system 1. Furthermore, it is preferable that those different in electric generation mode (for example, a solar generation device, a wind generation device, and a biomass generation device) as the electric power supplier and demander 15 exist together.

FIG. 3 is an explanation diagram showing electric power system in which an electric power supply and demand control device of an electric power supplier and demander performs supply and demand of AC electric power with other electric power supplier and demander.

Electric power suppliers and demanders 11a, 12a, 13a, 14a, and 15a shown in FIG. 3 correspond to the electric power suppliers and demanders 11, 12, 13, 14, and 15 shown in FIG. 1. An electric power supply and demand control device 51 of the electric power supplier and demander 11a shown in FIG. 3 includes a control device 511 and a bi-directional AC/DC converter 512.

Control devices of the respective electric power suppliers and demanders are configured so as to be able to perform data communication by a communication line CL, and can exchange supply and demand information in the case of the electric power supply and demand.

Furthermore, an electric power supply and demand control device 61 of the electric power supplier and demander 15a includes a control device 611, and a bi-directional AC/AC or DC/AC converter 612. When the supply and demand of AC electric power is performed between the electric power suppliers and demanders, voltage, current, frequency, and phase have to be matched between both the electric power suppliers and demanders. This matching is performed by the electric power supply and demand control devices 51 and 61. Incidentally, in FIG. 3, although not shown in the drawing, the electric power supply and demand control devices 51 and 61 can further include a circuit breaker, a current limiter, a watt-hour meter, and the like. In addition, in the electric power supplier and demander provided with the watt-hour meter and a capacitor, the control devices 51 and 61 control discharge; and in the electric power supplier and demander provided with a photovoltaic cell, there is provided with a conditioner which takes out the maximum electric power from a nonlinear electromotive force and adjusts to electric power of the rated characteristics.

FIG. 4 is an explanation diagram showing electric power system in which an electric power supply and demand control device of an electric power supplier and demander performs supply and demand of DC electric power with other electric power supplier and demander.

Electric power suppliers and demanders 11b, 12b, 13b, 14b, and 15b shown in FIG. 4 correspond to the electric power suppliers and demanders 11, 12, 13, 14, and 15 shown in FIG. 1. An electric power supply and demand control device 71 of the electric power supplier and demander 15b shown in FIG. 4 includes a control device 711 and a bi-directional DC/DC converter 712.

Control devices of the respective electric power suppliers and demanders are configured so as to be able to perform data communication by a communication line CL, and can exchange supply and demand information in the case of the electric power supply and demand.

Furthermore, an electric power supply and demand control device 81 of the electric power supplier and demander 11b includes a control device 811, and a bi-directional DC/DC or DC/AC converter 812. When the supply and demand of electric power in DC is performed between the electric power suppliers and demanders, adjustment of voltage and current is performed. Incidentally, in FIG. 4, although not shown in the drawing, the electric power supply and demand control devices 71 and 81 can further include a current limiter, a watt-hour meter, and the like. In addition, in the electric power suppliers and demanders provided with the watt-hour meter and a capacitor, their control devices 51 and 61 control charge/discharge; and in the electric power supplier and demander provided with a photovoltaic cell, there is provided with a conditioner which takes out the maximum electric power from a nonlinear electromotive force and adjusts to electric power of the rated characteristics.

FIG. 5 is an explanation diagram in the case of distributing DC electric power to a load via house wiring of an electric power supplier and demander.

In an electric power supplier and demander 11c shown in FIG. 5, there is specifically shown the power generation device, the electrical storage device, and a plurality of loads in the electric power supplier and demander 11 shown in FIG. 1. Incidentally, an electric power supply and demand control device 71 shown in FIG. 5 is the same as the electric power supply and demand control device 71 shown in FIG. 4.

In the electric power supplier and demander 11c, the power generation device is a solar generator 701 by way of example, the electrical storage device is a battery 702, and the plurality of loads are a DC load 7031 and an AC load 7032.

In this case, a bi-directional DC/DC converter 712 performs supply and demand of electric power with the battery 702, the solar generator 701, and the DC load 7031 and performs supply and demand of electric power with the AC load 7032 via a DC/AC converter 706.

Electric power generated by the solar generator 701 is supplied to the battery 702 and the DC load 7031 via, for example, the bi-directional DC/DC converter 712 or supplied to the AC load 7032 via the DC/AC converter 706.

The electric power supply and demand control device 71 includes a function which controls charging of the battery 702 and a function which compensates for stable output to the side of house wiring L.

Electric power from the electric power supply and demand control device 71 is supplied to the DC load 7031 via the house wiring L and the DC outlet 7051. The electric power from the electric power supply and demand control device 71 is supplied to the AC load 7032 via the house wiring L, the DC/AC converter 706A, and the AC outlet 7052. Incidentally, in FIG. 4, the DC outlet and the AC outlet are shown by one outlet, respectively; however, the DC outlet and the AC outlet are provided with a plurality of outlets, respectively, and the DC loads and the AC loads can be connected to those outlets.

In the respective electric power suppliers and demanders 11, 15, and the like in the electric power system of the present invention described above, the electric power supply and demand control devices 104, 153, and the like in which the respective electric power suppliers and demanders 11, 15, and the like include are served as nodes and the electrical feeder line W among the respective electric power suppliers and demanders 11, 15, and the like is served as a link; accordingly, an electric power network is formed. Therefore, the respective electric power supply and demand control devices 104, 153, and the like are provided with a function which controls exchange of electric power among the respective electric power suppliers and demanders 11, 15, and the like.

The fundamental function of the electric power supply and demand control devices 104 and 153 is determination of the electric power suppliers and demanders 11, 15, and the like serving as other parties who perform exchange of electric power; determination of whether the exchange of electric power with the other parties is delivery or intake; control of an electric power rate and an electric energy and the like. This function controls at a high level that connection is made by communication circuits among the electric power networks; data such as necessary electric power and electric power available for supply for mutual electric power suppliers and demanders, an electric energy and an electric power rate thereof, and these related future estimations are exchanged and processed; and electric power among the respective electric power suppliers and demanders is accommodated with each other.

The function of the above electric power supply and demand control devices 104 and 153 serve as a circuit breaker and a current limiter by configuring based on, for example, a voltage converter, a current controller, and a switch, which are provided with various control functions; by individually switching communication channels of necessary electric power by control of the converter or the like; and by being based on the size of a transmission current and characteristic analysis of transient phenomenon. This allows the electric power supply and demand control devices 104 and 153 to control so that, for example, when an electrical fault is occurred in a certain electric power supplier and demander, each electrical device (load 103), electrical storage device 102, and power generation device 101 of the supplier and demander are not completely cut off, but only a necessary line is cut off and other line can be used without cutting off.

By the way, in the electric power system shown in FIG. 1, a properly collected number of groups of the electric power suppliers and demanders can be treated as one electric power supplier and demander. As shown in FIG. 5, electric power supplier and demander groups G11, G12, . . . show a group at this time (for example, approximately several tens to ten thousands of houses).

In FIG. 6, the electric power supplier and demander groups G11, G12, . . . are mutually connected via electric power supply and demand control devices S1. Furthermore, higher hierarchy of the electric power supplier and demander groups G11, G12, . . . are represented by G21, G22, . . . , and further higher hierarchy are represented by G31, G32, G33, . . . . In this case, although not shown in the drawing, further higher hierarchy than G31, G32, G33, . . . are formed.

For example, the electric power supplier and demander groups G11, G12 . . . are set as a "town" unit; G21, G22, . . . are set as a "city" unit; and G31, G32, G33, . . . are set as a "prefecture" unit.

In FIG. 6, the electric power supplier and demander groups G11, G12, . . . are mutually connected with other electric power suppliers and demanders by the electric power supply and demand control devices S1; however, the respective higher hierarchies and lower hierarchies are hierarchically connected with each other via electric power supply and demand control devices S2, S3, S4, . . . .

In the above embodiments, there is described a case where the respective electric power suppliers and demanders are connected in a branched shape as shown in FIG. 7(A). The respective electric power suppliers and demanders may be connected in a star shape as shown in FIG. 7(B) or may be connected in a net shape as shown in FIG. 7(C). Further, the respective electric power suppliers and demanders may be connected in a mode combined with these shapes.

FIG. 8 is a diagram showing an example of an electric power supplier and demander connected via an electric power supply and demand line which is different from a plurality of other electric power suppliers and demanders. In FIG. 8, a bi-directional DC/DC converter 712 transports electric power among the electric power supply and demand lines W1, W2, and W3 and can intermediate electric power supply and demand among other electric power suppliers and demanders, for example, in the connection mode of the electric power suppliers and demanders as shown in FIG. 7(C). The transportation of electric power among the electric power supply and demand lines W1 to W3 includes a mode which supplies and demands electric power by moving a movable power generation device and/or a movable electrical storage device.

INDUSTRIAL APPLICABILITY

According to the present invention, there can be provided an electric power system, in which a plurality of electric power suppliers and demanders is configured by being mutually connected by electric power supply and demand control devices, without depending on the known electric power system.

BRIEF DESCRIPTION OF THE DRAWINGS

FIG. 8 is a diagram showing an example of an electric power supplier and demander connected via an electric power supply and demand line which is different from a plurality of other electric power suppliers and demanders.

DESCRIPTION OF REFERENCE NUMERALS

Figure 1:
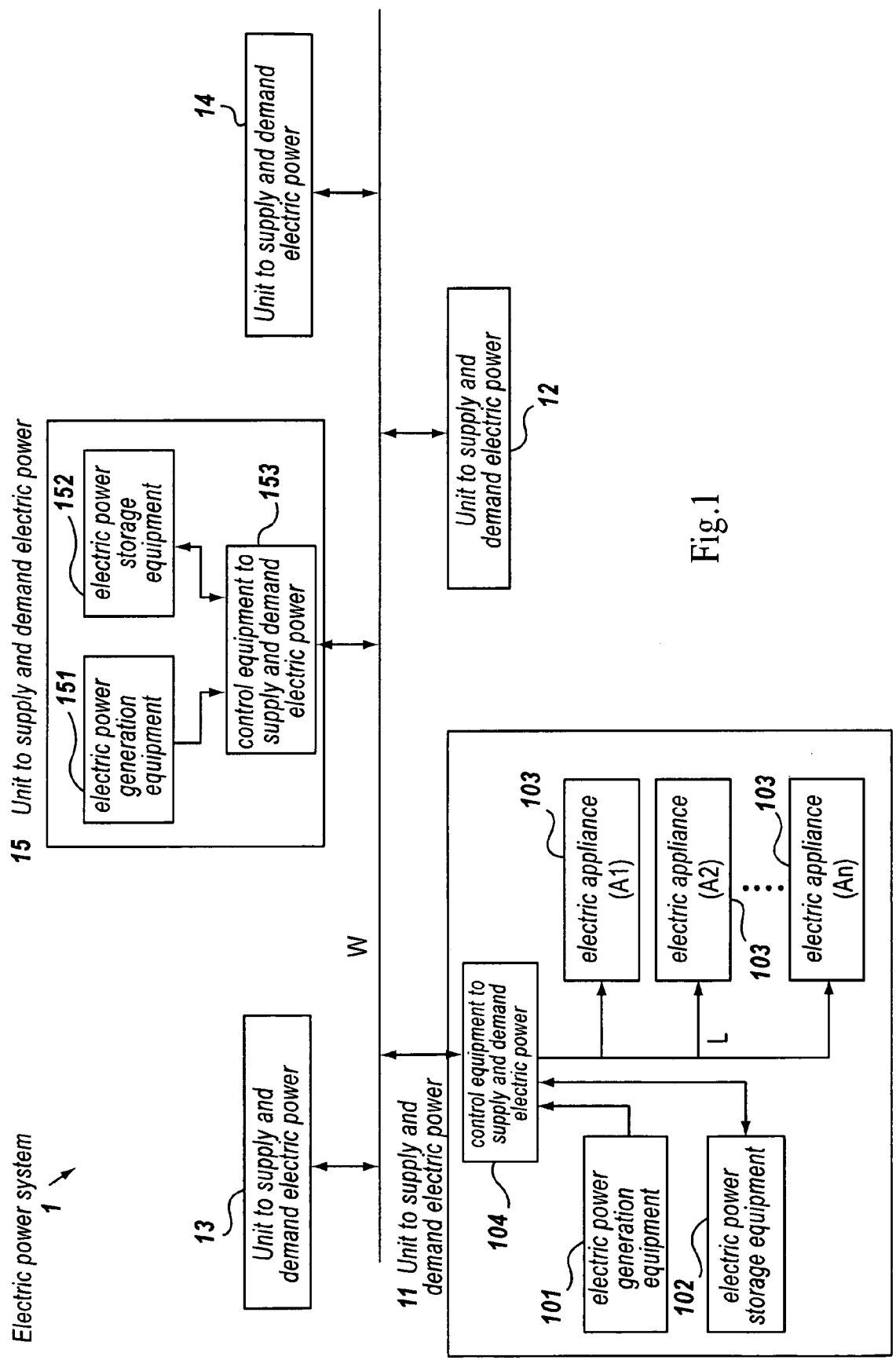
FIG. 1 is an explanation diagram showing an embodiment of an electric power system of the present invention.
Figure 2:
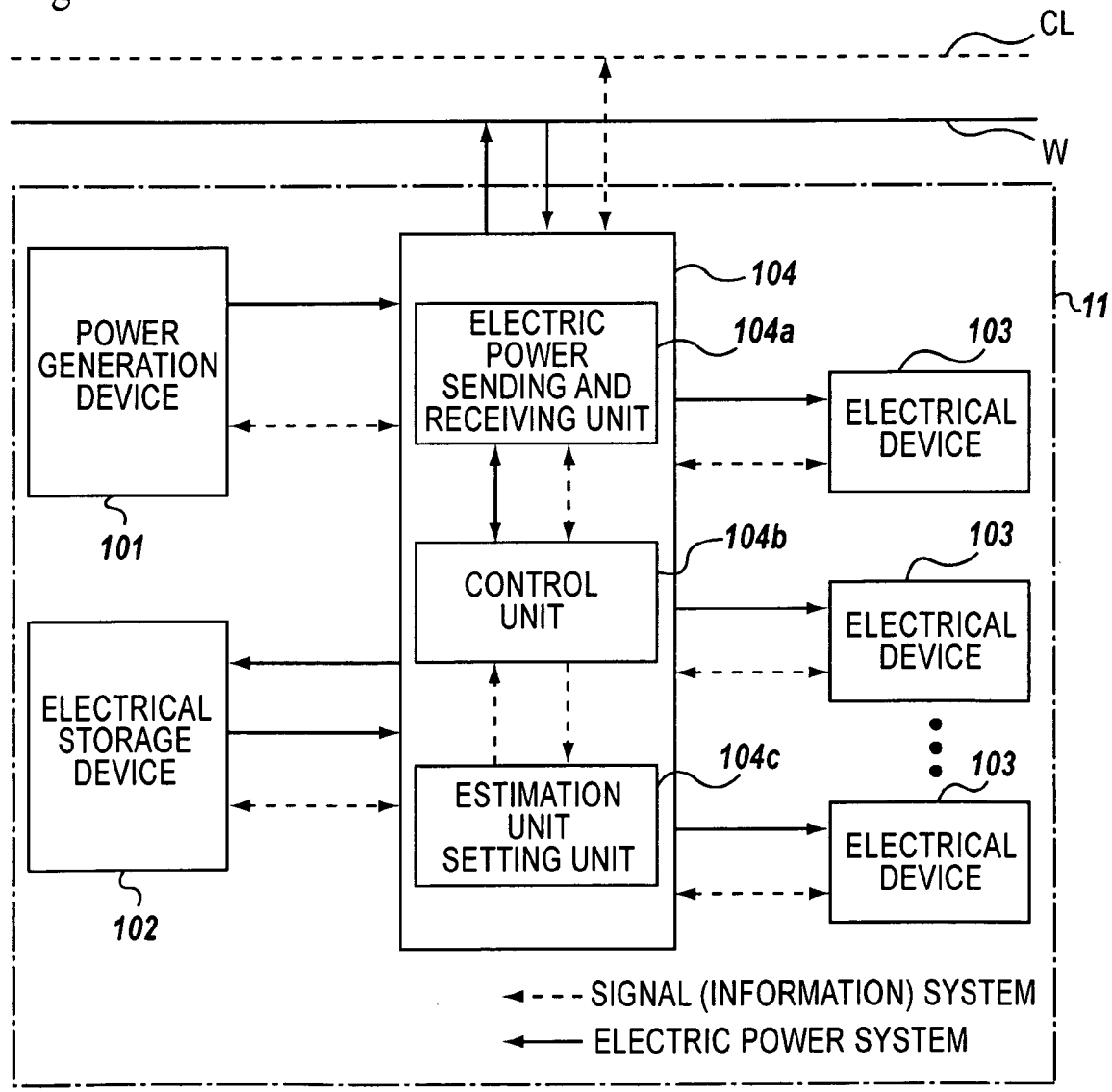
FIG. 2 is a block diagram exemplifying a configuration of one electric power supplier and demander and an electric power supply and demand control device thereof.
Figure 3:
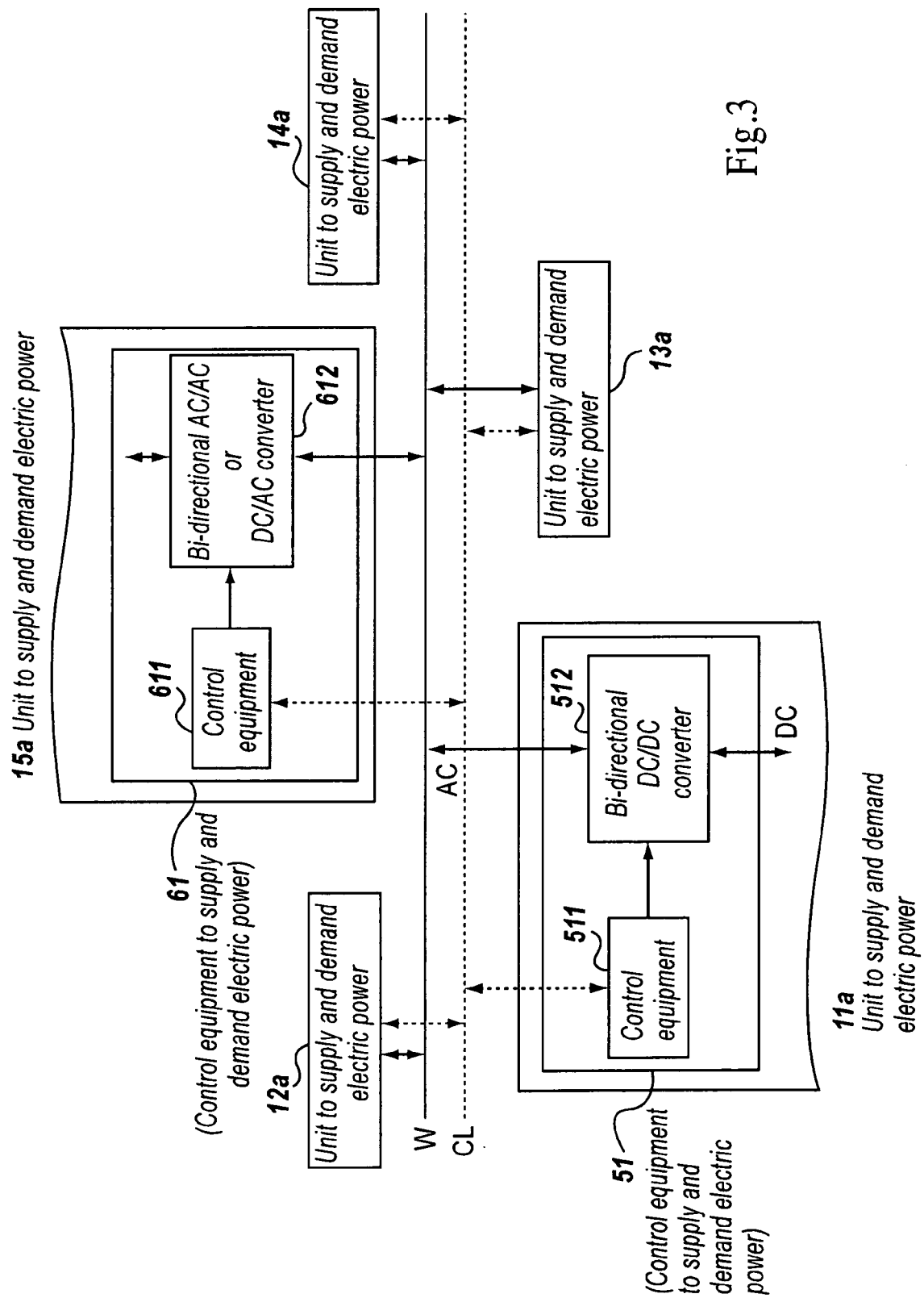
FIG. 3 is an explanation diagram at a time when an electric power supply and demand control device of an electric power supplier and demander performs supply and demand of AC electric power with other electric power supplier and demander in an electric power system of the present invention.
Figure 4:
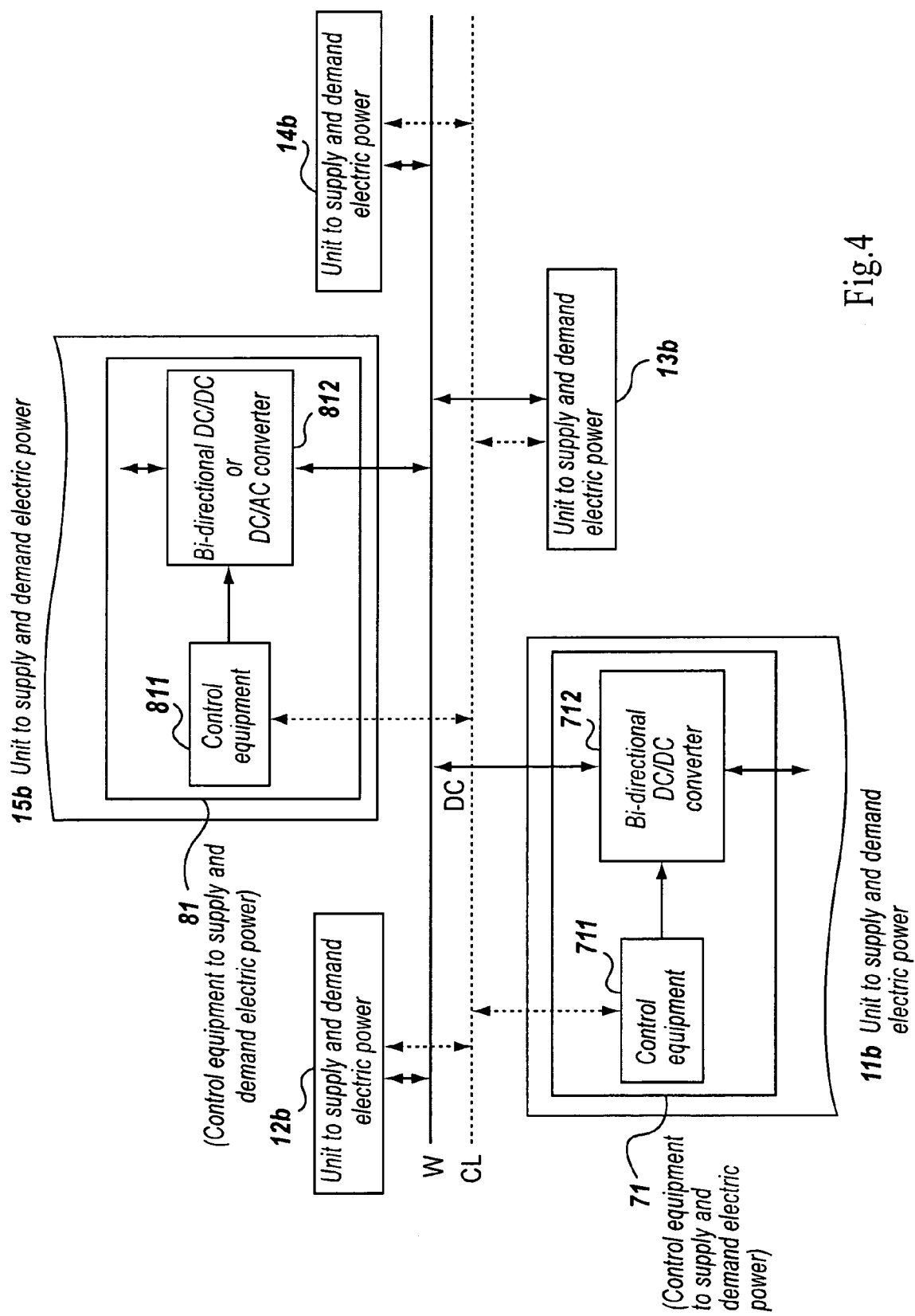
FIG. 4 is an explanation diagram at a time when an electric power supply and demand control device of an electric power supplier and demander performs supply and demand of DC electric power with other electric power supplier and demander in an electric power system of the present invention.
Figure 5:
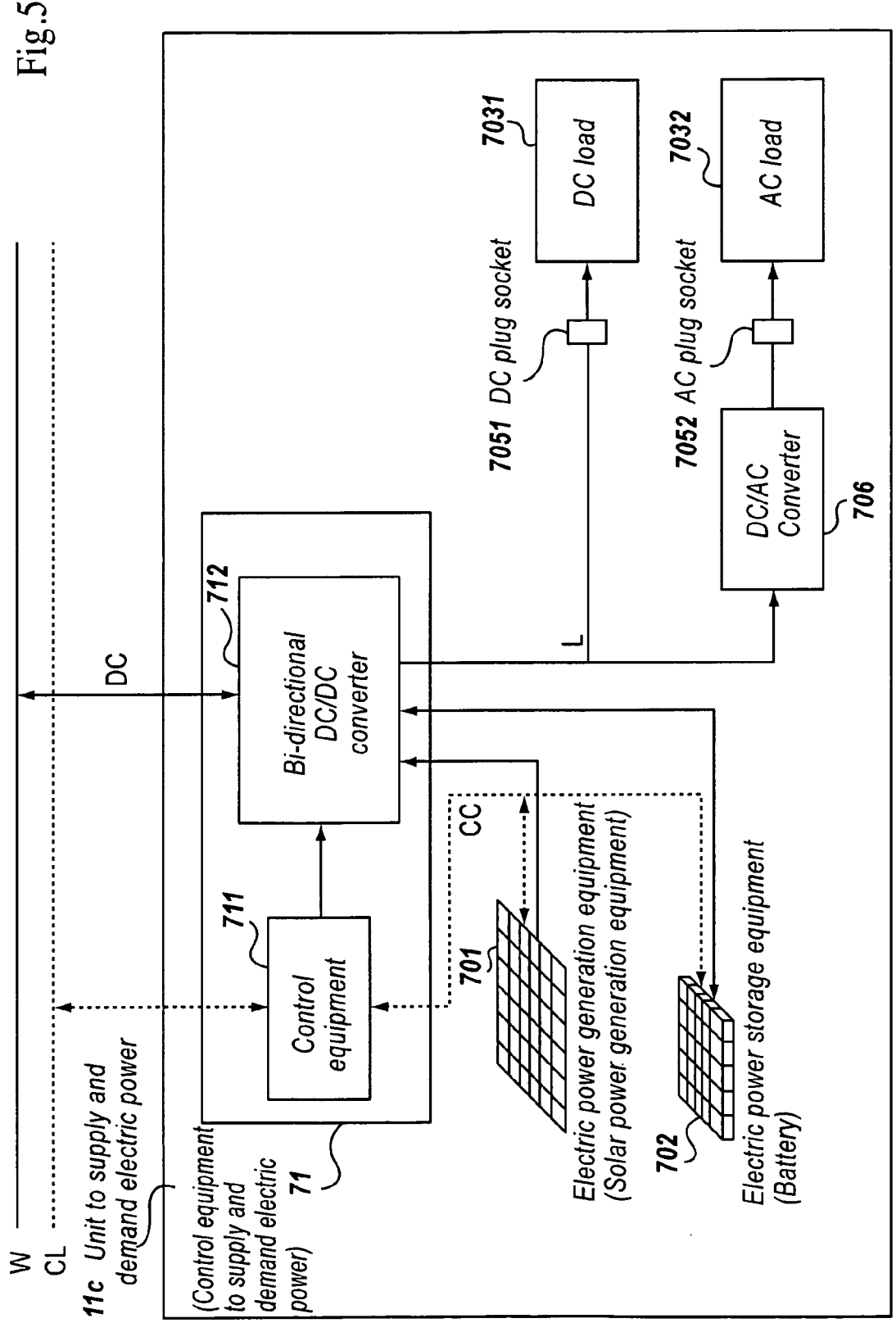
FIG. 5 is an explanation diagram in the case of supplying DC electric power to a load via house wiring of an electric power supplier and demander in an electric power system of the present invention.
Figure 6:
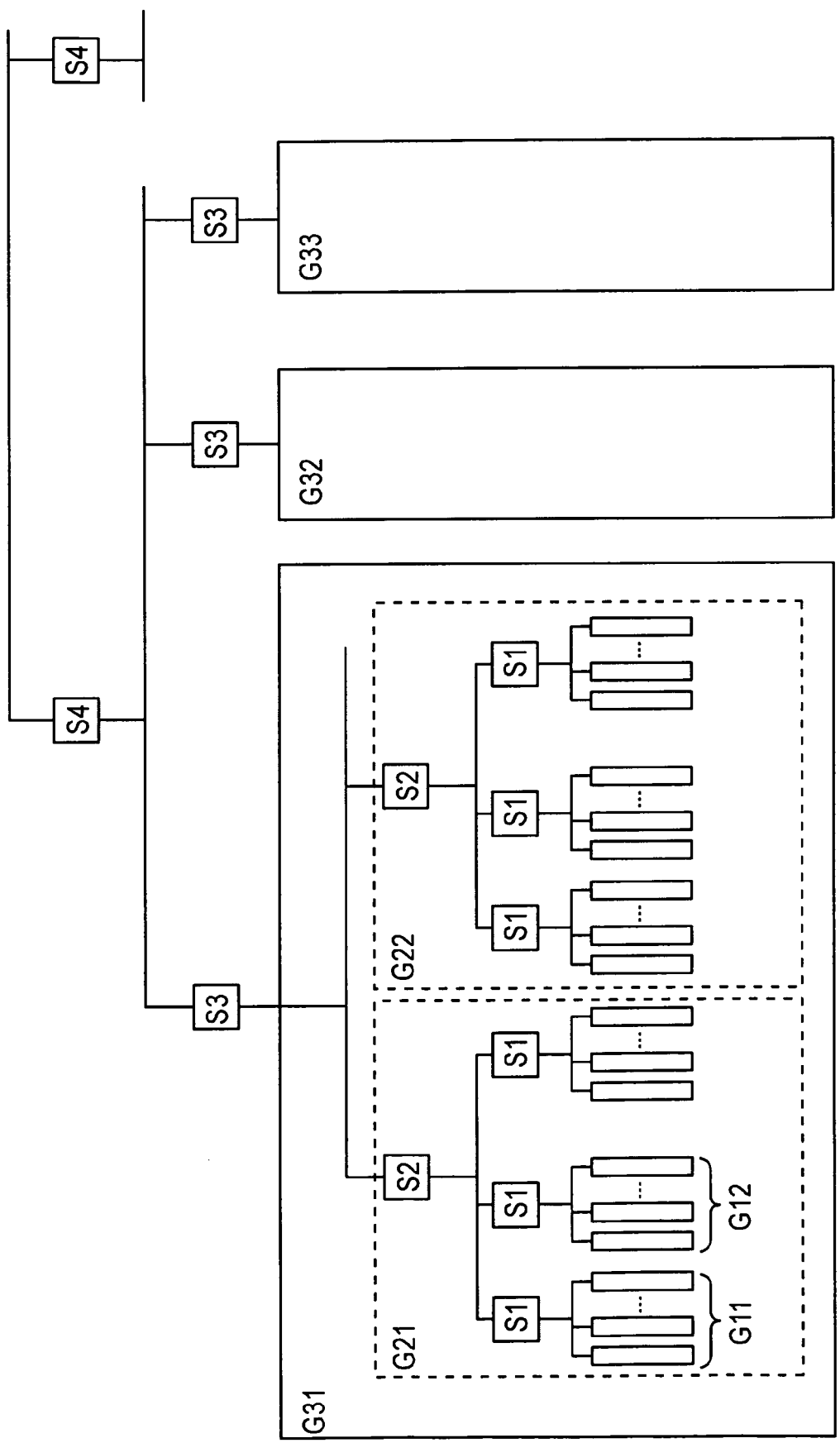
FIG. 6 is an explanation diagram showing a state where electric power suppliers and demanders are hierarchized in an electric power system of the present invention.
Figure 7A:
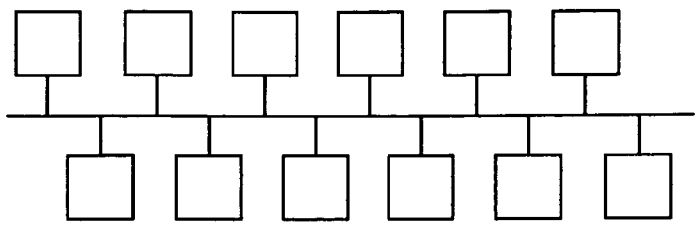
FIG. 7(A) is an explanation diagram in the case where electric power suppliers and demanders are connected in a branched shape.
Figure 7B:
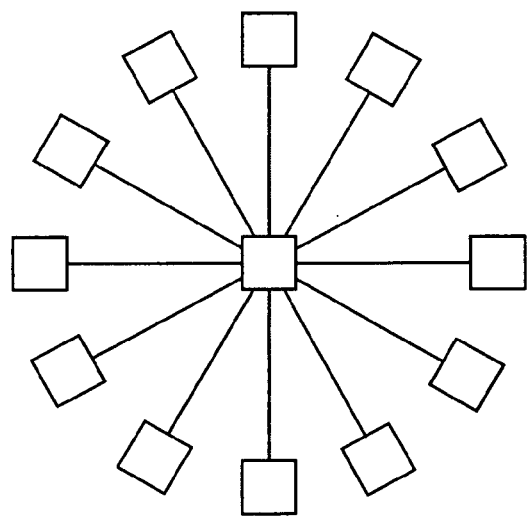
FIG. 7(B) is an explanation diagram in the case where the electric power suppliers and demanders are connected in a star shape.
Figure 7C:
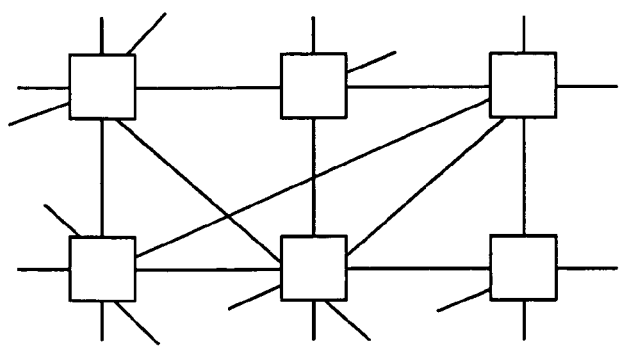
FIG. 7(C) is an explanation diagram in the case where the electric power suppliers and demanders are connected in a net shape.
Figure 9:
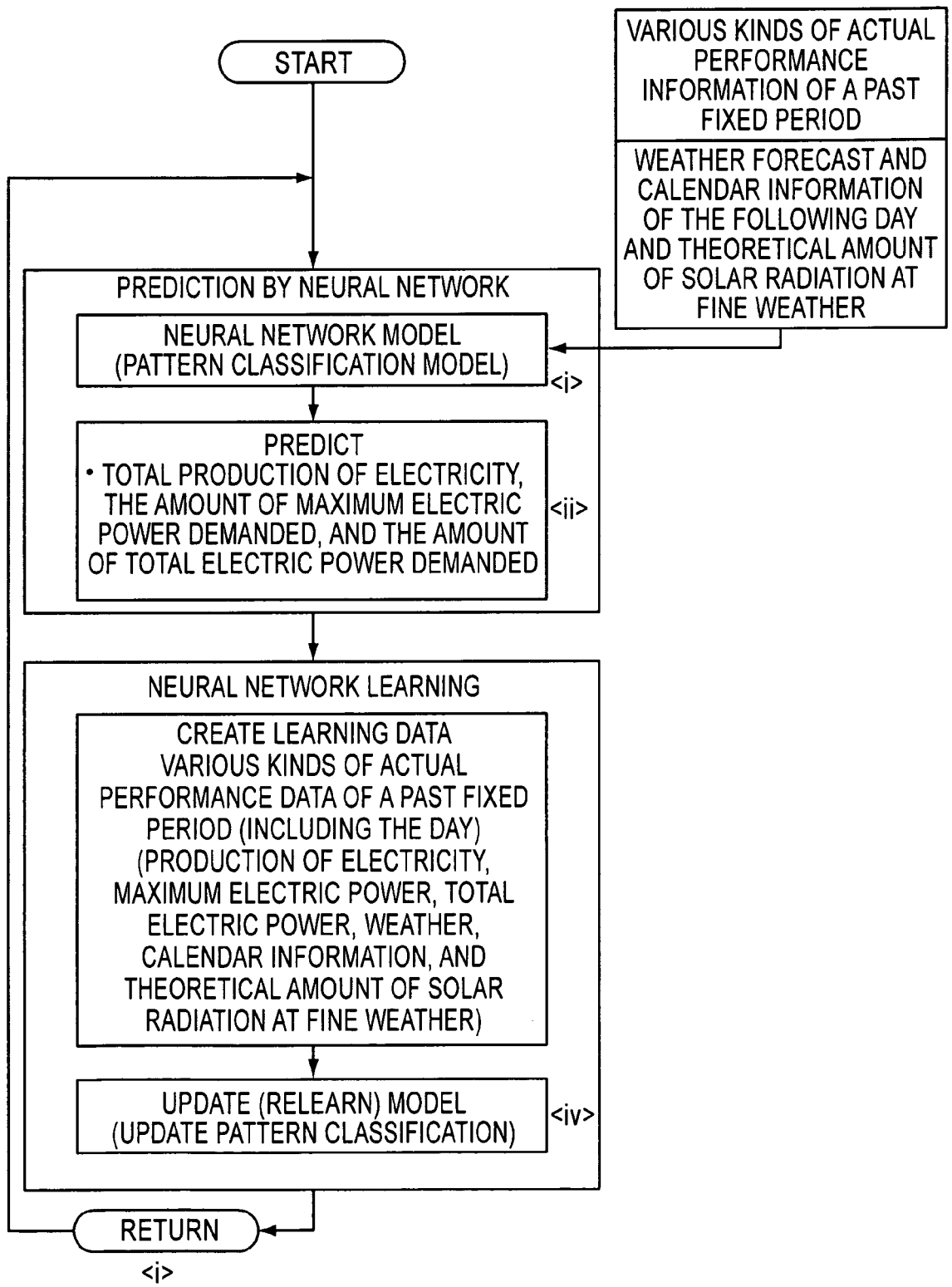
FIG. 9 is a block diagram showing a process example of a neural network.
Figure 10:
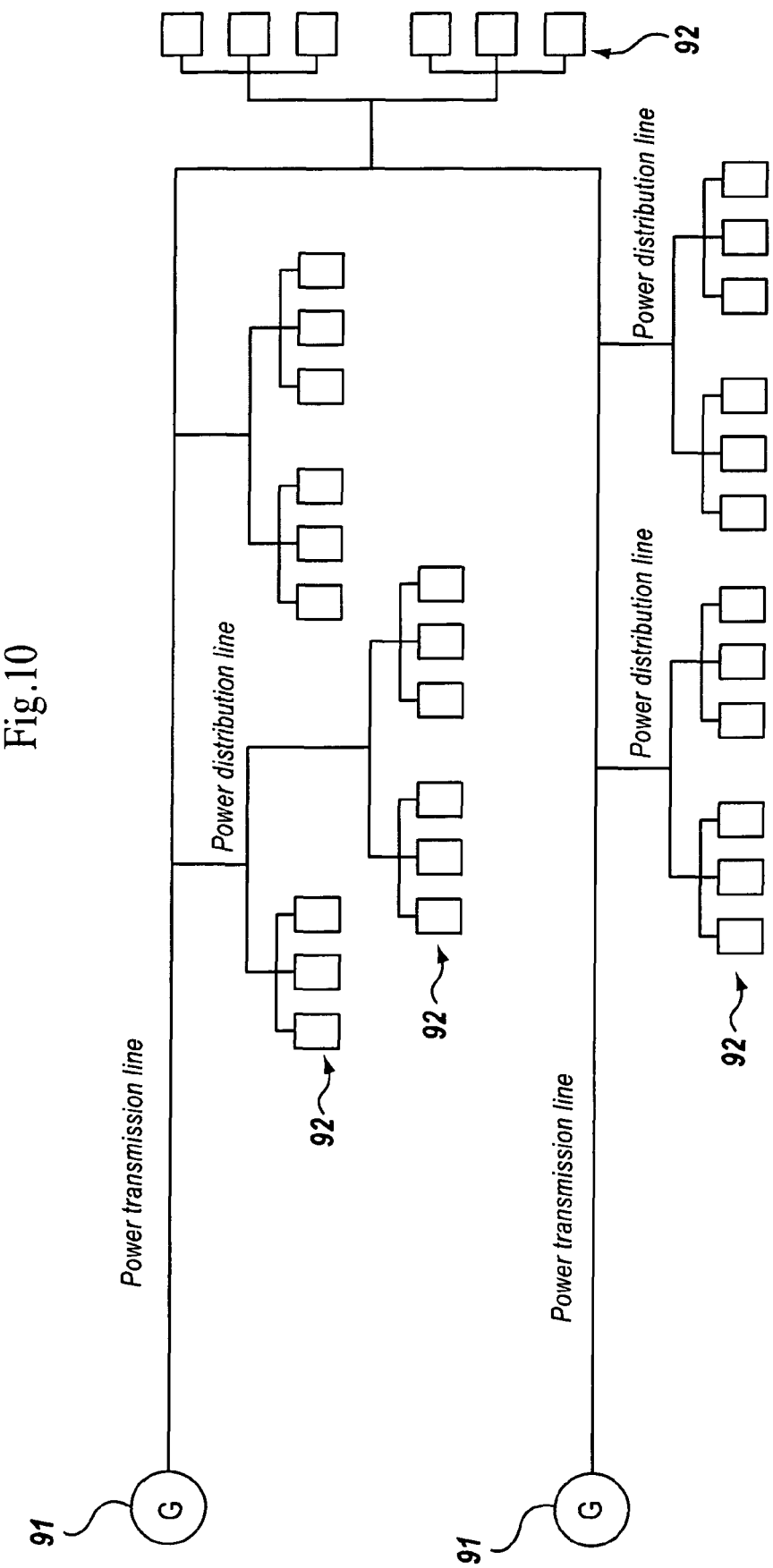
FIG. 10 is an explanation diagram showing a known electric power system.

1 Electric power system
11, 12, 13, 14, 11a, 12a, 13a, 14a, 11b, 12b, 13b, 14b, 11c, 11d, 12c, 13c, 14c, 15, 15a, and 15b Electric power supplier and demander
51, 61, 71, 81, 104, and 153 Electric power supply and demand control device
101 and 151 Power generation device
102 and 152 Electrical storage device
103 Load
511, 611, 711, and 811 Control device
512 Bi-directional AC/DC converter
612 Bi-directional AC/AC or DC/AC converter
706 DC/AC converter
712 Bi-directional DC/DC converter
812 Bi-directional DC/DC or DC/AC converter
CC Communication line
CL Communication line
L House wiring
W, W1, W2, and W3 Electric power supply and demand line

The invention claimed is:

1. An electric power system in which a plurality of electric power suppliers and demanders is mutually connected, the electric power supplier and demander being provided with one or a plurality of power generation devices, one or a plurality of electrical storage devices and one or a plurality of electric power consumption devices, and an electric power supply and demand control device, wherein each of said electric power supply and demand control devices judges whether or not electric power shortage is occurred or whether or not electric power surplus is occurred in each of said electric power suppliers and demanders provided with the electric power supply and demand control device, receives electric power from other electric power supplier and demander provided with said power generation device and/or said electrical storage device in the case where electric power shortage is occurred in the electric power supplier and demander, and controls to deliver electric power to other electric power supplier and demander in the case where electric power surplus is occurred in said electric power supplier and demander; and controls the plurality of said power generation devices in respective electric power suppliers and demanders in the delivery and receipt of electric power among respective electric power suppliers and demanders, the control being automatically or manually performed based on that a pattern classification model for a neural network is formed in a computer, total production of electricity, maximum electric power demand, and total electric power demand of the following day are predicted based on at least past actual performance data, weather forecast and calendar information of the following day, and theoretical amount of solar radiation at fine weather of the day, actual performance data of the forecast items and weather, calendar information, and theoretical amount of solar radiation of a past fixed period including at least the day are collected for neural network relearning, the relearning is performed by an error back propagation algorithm based on the prediction data and actual performance data of the day, and the total production of electricity, the amount of maximum electric power demanded, and the amount of total electric power demanded of the following day are predicted by an updated neural network.

2. The electric power system according to claim 1, wherein, when accommodation of delivery and receipt of excess or deficient electric power is performed among respective electric power suppliers and demanders based on the total production of electricity, the amount of maximum electric power demanded, and the amount of total electric power demanded for each electric power supplier and demander predicted by the neural network, said respective electric power suppliers and demanders exchange information on its electric energy and timing among said respective electric power supply and demand control devices.

3. The electric power system according to claim 1 or 2, further comprising an electrical storage device such as a battery capable of operating an electrical device for a predetermined time, said electrical storage device being mounted in the electrical device whose electric power consumption is large or starting electric power is large, including a refrigerator and an air conditioner in each electric power supplier and demander.

4. An electric power system in which a plurality of electric power suppliers and demanders is mutually connected, the electric power supplier and demander being provided with at least one device selected from one or a plurality of power generation devices, one or a plurality of electrical storage devices and one or a plurality of electric power consumption devices, and an electric power supply and demand control device, wherein said plurality of the electric power suppliers and demanders is sectioned into a plurality of groups; and said electric power supply and demand control device which belongs to each group;

judges whether or not electric power shortage is occurred or whether or not electric power surplus is occurred in the group;

receives electric power from other group to which said electric power supplier and demander provided with said power generation device and/or said electrical storage device belongs in the case where electric power shortage is occurred in the group, and controls to deliver electric power to other group in the case where electric power surplus is occurred in the group; and controls the plurality of said power generation devices in said respective electric power suppliers and demanders of the respective groups in the delivery and receipt of electric power among the respective groups, the control being automatically or manually performed based on that a pattern classification model for a neural network is formed in a computer, total production of electricity, maximum electric power demand, and total electric power demand of the following day are predicted based on at least past actual performance data, weather forecast and calendar information of the following day, and theoretical amount of solar radiation at fine weather of the day, actual performance data of the forecast items and weather, calendar information, and theoretical amount of solar radiation of a past fixed period including at least the day are collected for neural network relearning, the relearning is performed by an error back propagation algorithm based on the prediction data and actual performance data of the day, and the total production of electricity, the amount of maximum electric power demanded, the amount of total electric power demanded of the following day are predicted by an updated neural network.

5. The electric power system according to claim 4, wherein, when accommodation of delivery and receipt of excess or deficient electric power is performed among respective electric power suppliers and demanders based on the total production of electricity, the amount of maximum electric power demanded, and the amount of total electric power demanded for each electric power supplier and demander predicted by the neural network, said respective electric power suppliers and demanders exchange information on its electric energy and timing among said respective electric power supply and demand control devices.

6. The electric power system according to claim 4 or 5, further comprising an electrical storage device such as a battery capable of operating an electrical device for a predetermined time, said electrical storage device being mounted in the electrical device whose electric power consumption is large or starting electric power is large, including a refrigerator and an air conditioner in each electric power supplier and demander.

7. The electric power system according to claim 4 or 5, wherein the plurality of said electric power suppliers and demanders are connected to a branched electric power supply and demand line, a beaded electric power supply and demand line, a radiated electric power supply and demand line, a net shaped electric power supply and demand line, or an electric power supply and demand line combined with these lines.

8. The electric power system according to claim 4 or 5, wherein the plurality of said electric power suppliers and demanders are mutually connected in DC.

* * * * *